United States Patent
Mizrahi

(10) Patent No.: US 11,366,610 B2
(45) Date of Patent: Jun. 21, 2022

(54) SOLID-STATE DRIVE WITH INITIATOR MODE

(71) Applicant: Marvell Asia Pte, Ltd., Singapore (SG)

(72) Inventor: Noam Mizrahi, Modi'n (IL)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 16/717,408

(22) Filed: Dec. 17, 2019

(65) Prior Publication Data
US 2020/0201575 A1   Jun. 25, 2020

Related U.S. Application Data

(60) Provisional application No. 62/783,060, filed on Dec. 20, 2018.

(51) Int. Cl.
*G06F 3/06* (2006.01)

(52) U.S. Cl.
CPC .......... *G06F 3/0659* (2013.01); *G06F 3/0611* (2013.01); *G06F 3/0653* (2013.01); *G06F 3/0679* (2013.01); *G06F 3/0683* (2013.01)

(58) Field of Classification Search
CPC .... G06F 3/0659; G06F 3/0611; G06F 3/0653; G06F 3/0679; G06F 3/0683
See application file for complete search history.

(56) References Cited

U.S. PATENT DOCUMENTS

| | | | |
|---|---|---|---|
| 9,313,128 B2 | 4/2016 | Morimoto | |
| 9,785,355 B2 | 10/2017 | Huang | |
| 10,162,793 B1 | 12/2018 | Bshara et al. | |
| 10,423,358 B1 | 9/2019 | Foo | |
| 10,671,302 B1 | 6/2020 | Aggarwal et al. | |
| 10,691,368 B2 | 6/2020 | Kachare et al. | |
| 2005/0243818 A1 | 11/2005 | Foglar et al. | |
| 2015/0006663 A1 | 1/2015 | Huang | |
| 2016/0085718 A1 | 3/2016 | Huang | |
| 2016/0127492 A1 | 5/2016 | Malwankar et al. | |
| 2016/0210062 A1 | 7/2016 | McCambridge et al. | |
| 2017/0149920 A1 | 5/2017 | Sammatshetti | |
| 2017/0286363 A1 | 10/2017 | Joshua et al. | |
| 2018/0046594 A1 | 2/2018 | Worley et al. | |
| 2018/0081565 A1 | 3/2018 | Tan et al. | |
| 2018/0101450 A1* | 4/2018 | Park | G06F 11/1662 |

(Continued)

FOREIGN PATENT DOCUMENTS

| | | |
|---|---|---|
| WO | WO-2016/182756 | 11/2016 |
| WO | WO-2018/217316 A1 | 11/2018 |

OTHER PUBLICATIONS

U.S. Appl. No. 16/817,846, Noam Mizrahi, "Solid-State Drive with Inhibitor Mode," filed Mar. 13, 2020.

(Continued)

*Primary Examiner* — Eric Cardwell

(57) ABSTRACT

A solid-state drive configured to store persistent digitally encoded data may operate in an initiator mode. When operating in the initiator mode, the solid-state drive may initiate the generation and issuance of a command or a request for another solid-state drive to carry out a data storage related procedure. The command or request generated by the solid-state drive may be communicated directly to another solid-state drive without the communications passing through an intermediate device, such as a host processor.

20 Claims, 3 Drawing Sheets

(56) References Cited

U.S. PATENT DOCUMENTS

| | | | |
|---|---|---|---|
| 2018/0107591 A1* | 4/2018 | Smith | G06F 3/0679 |
| 2018/0284989 A1 | 10/2018 | Kachare et al. | |
| 2018/0284990 A1 | 10/2018 | Kachare et al. | |
| 2018/0285019 A1 | 10/2018 | Olarig et al. | |
| 2018/0321876 A1 | 11/2018 | Ballapuram et al. | |
| 2019/0107956 A1 | 4/2019 | Kachare et al. | |
| 2019/0163364 A1 | 5/2019 | Gibb et al. | |
| 2019/0250855 A1 | 8/2019 | Kachare et al. | |
| 2019/0272123 A1 | 9/2019 | Gissin et al. | |
| 2019/0317901 A1 | 10/2019 | Kachare et al. | |
| 2020/0125157 A1 | 4/2020 | Kachare et al. | |
| 2020/0225863 A1 | 7/2020 | Veluswamy et al. | |
| 2020/0225874 A1 | 7/2020 | Nimmagadda et al. | |

OTHER PUBLICATIONS

U.S. Appl. No. 16/820,320, Shahar Noy et al., "Ethernet Enabled Solid State Drive (SSD)," filed Mar. 16, 2020.

U.S. Appl. No. 16/820,308, Haimzon et al., "Transferring Data Between Solid State Drives (SSDs) via a Connection Between the SSDs," filed Mar. 16, 2020.

Search Report in European Patent Application No. 19218779.7, dated Mar. 16, 2020 (7 pages).

Hoff, "Checklist for What's New in NVMe™ over Fabrics," https://nvmexpress.org/checklist-for-whats-new-in-nvme-over-fabrics, 3 pages (Oct. 29, 2018).

* cited by examiner

SOLID-STATE DRIVE WITH INITIATOR MODE

CROSS REFERENCE TO RELATED APPLICATION

This disclosure claims the benefit of priority of U.S. Provisional Application Ser. No. 62/783,060, filed Dec. 20, 2018, entitled, "SOLID-STATE DRIVE (SSD) INITIATOR MODE", the contents of which is incorporated herein by reference in its entirety.

FIELD OF USE

This disclosure generally relates to the field of data storage for computer and electronic network systems, and more particularly to operating modes for data storage devices.

BACKGROUND

A solid-state drive (SSD) is a data storage device that uses non-volatile memory, such as NAND (Not-And) or NOR (Not-Or) non-volatile memory, to store persistent digitally encoded data. The SSD may be configured to emulate a hard disk drive, i.e., a device that stores persistent digitally encoded data on magnetic surfaces of rapidly rotating platters and replaces a hard disk drive (HDD) in many applications.

A host is typically coupled to the SSD to read data from the SSD, write data to the SSD, and erase data from the SSD. The host may be coupled to the SSD through an intermediary device, such as an interface switch. To facilitate the reading, writing, and erasing of the data, the SSD may include an SSD controller with a host interface for communicating with the host, and a non-volatile memory interface for managing the non-volatile memory included at the SSD. The host interface includes addressing, a data bus, and control for communicating with the host, and conforms to a data communication protocol such as Serial Advanced Technology Attachment (SATA), Serial Attached Small Computer System Interface (SAS), Non-Volatile Memory Express (NVMe) or Universal Serial Bus (USB), while the non-volatile memory interface includes addressing, a data bus, and control for managing the non-volatile memory and conforms to a data communication protocol such as open NAND flash interface (ONFI) for NAND non-volatile memory.

In operation, the host generally issues requests for data storage services, such as write, read, and erase requests to perform a write, read, and erase operation, respectively, on data stored at the SSD. To perform the write operation, the host sends a write request to the SSD, in various instances through the interface switch. The write request indicates data to write and a data address where to write the data. The write request is received at the host interface of the SSD. The SSD controller then executes hardware and/or firmware to write the data in the non-volatile memory based on the data address, via the non-volatile memory interface. To perform the read operation, the host sends a read request, in some instances through the interface switch, to the SSD. The read request indicates a data address to read. The read request is received at the host interface of the SSD. The SSD controller executes hardware and/or firmware to read data in the non-volatile memory based on the data address. The SSD controller receives the data that is read from the non-volatile memory via the non-volatile memory interface and provides the read data to the host via the host interface. To perform the erase operation, the host sends an erase request to the SSD, in some instances through the interface switch. The erase request indicates a data address to erase. The erase request is received at the host interface of the SSD. The SSD controller executes hardware and/or firmware to perform an erase operation in the non-volatile memory based on the data address.

SUMMARY

This disclosure relates to solid-state drives (SSD) that are configured to generate and initiate one or more requests and commands that may be directly communicated between one or more peer SSD devices without the need to have these requests and commands transferred between the SSD devices through a host device. In embodiments described in this disclosure, an SSD may operate in an initiator mode, and generate and issue requests and/or commands to one or more other SSDs using direct couplings that do not involve the use of a host device that the SSDs may also be coupled to. This initiation and direct coupling of the requests and commands between SSD devices may eliminate the need to have these requests and/or commands replicated by a host device as part of the handling of the requests and/or commands being communicated between separate SSD devices, and may also eliminate the need to translate the request and/or commands from one protocol or format to a different protocol or format for the communication standards that would normally be needed if the requests and/or commands were being communicated between SSD devices through a host device instead of using the direct coupling as described in this disclosure.

According to an aspect of the described system and techniques, a method comprises: establishing, at a first solid-state drive and at a second solid-state drive, a set of queues configured for controlling direct communications between the first solid-state drive and the second solid-state drive over an interconnect coupling the first solid-state drive with the second solid-state drive; initiating, by the first solid-state drive, generation of at least one command or request; and driving, by the first solid-state drive, the at least one command or request over the interconnect so that the at least one command or request is communicated directly between the first solid-state drive and the second solid-state drive.

According to another aspect of the described system and techniques, a non-transitory computer-readable medium storing instructions that, when executed by one or more processors, cause the one or more processors to at least: establish, at a first solid-state drive and at a second solid-state drive, a set of queues configured for controlling direct communications between the first solid-state drive and the second solid-state drive over an interconnect coupling the first solid-state drive with the second solid-state drive; initiate, at the first solid-state drive, generation of at least one command or request; and drive the at least one command or request over the interconnect so that the at least one command or request is communicated directly between the first solid-state drive and the second solid-state drive.

According to yet another aspect of the described system and techniques, an apparatus comprises: a solid-state drive comprising a local processor and a memory array, wherein the memory array is configured to store persistent digitally encoded data on non-volatile memory, and wherein the local processor is configured to operate in a initiator mode wherein the local processor initiates generation of a command or a request for a data storage procedure that is communicated directly over an interconnect to one or more additional solid-state drives communicatively coupled to the solid-state drive.

Figure 1:
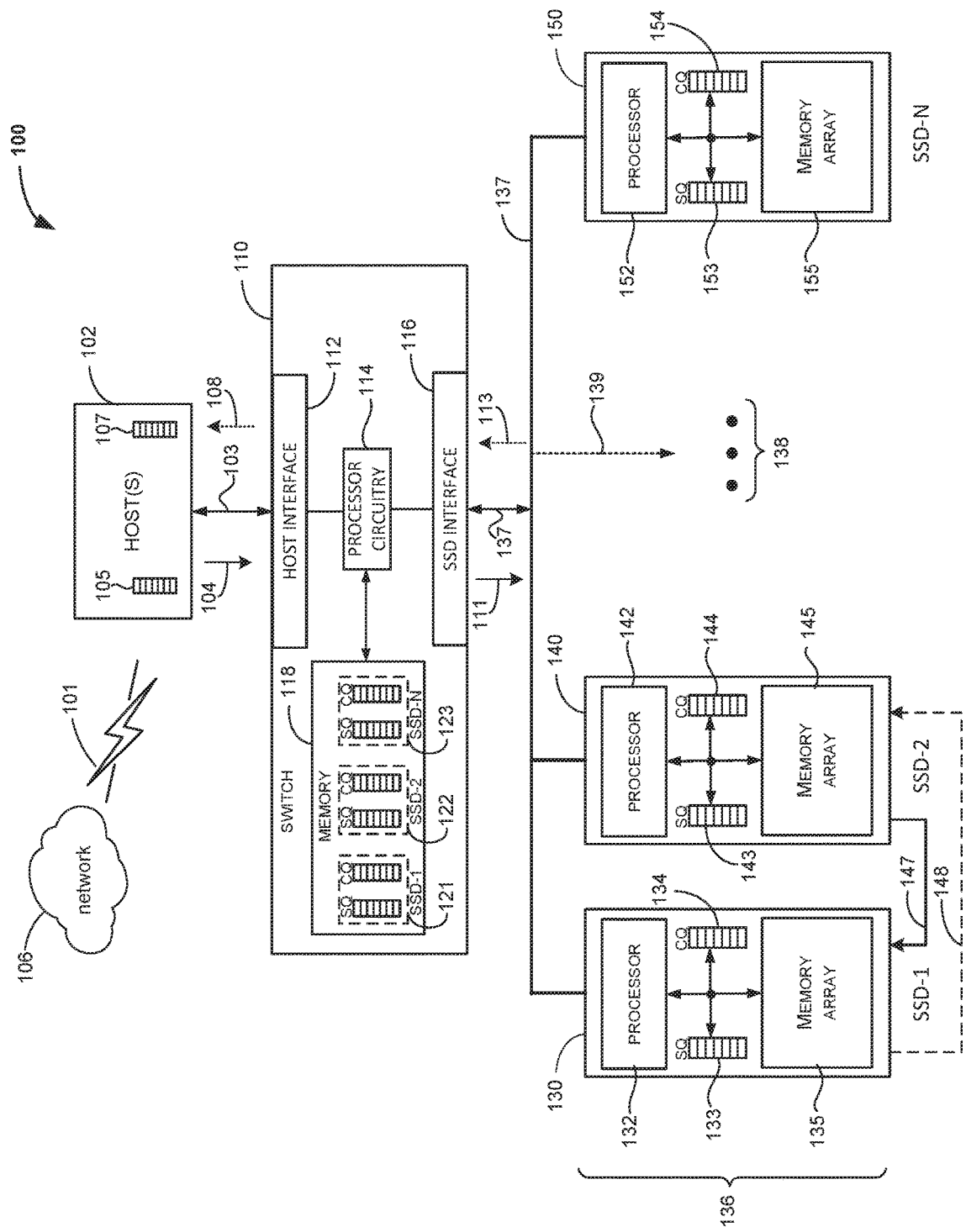
FIG. 1 illustrates an example configuration of a storage system including solid-state storage drives configured to operate in an initiator mode.

The drawings are for the purpose of illustrating example embodiments, but it is understood that the embodiments are not limited to the arrangements and instrumentality shown in the drawings.

DETAILED DESCRIPTION

This disclosure provides examples and details relates to data storage services provided to a one or more hosts having a switching device coupled between one or more hosts and solid-state drives (SSDs) configured to provide data storage. The SSDs are configured to receive, process, and respond to requests for data storage services made by the one or more hosts and communicated through the switching device. In addition, the SSDs themselves are configured to operate as request initiators, wherein a request for data storage services may originate from a first SSD of one of one or more SSDs, wherein the first SSD may be referred to as an initiator SSD. The request for data storage service(s) initiated by the initiator SSD may be communicated to, received by, processed, and responded to by a second one of the SSDs (referred to as the target SSD), the communications between the initiator SSD and the target SSD using direct communication links coupling the initiator SSD and the target SSD without the need to communicate through an intermediary device. a host processor. Although an intermediary device such as a switching device or a host is not required, one or more intermediary devices may operate in a pass through mode as part of a connectivity scheme coupling one or more SSDs. The principles described herein may be applied to controlling performance of other types of storage devices, such as a hard disk drive (HDD) or hybrid SSD/HDD drives.

FIG. 1 illustrates an example configuration of a data storage system 100 which provides various data storage services to a host, while also providing SSDs configured to operate as initiators of commands or requests for data storage services or for performance of a data storage procedure, the commands or requests being communicated directly between SSDs without the need for the command or request to be originated by a host coupled to the system, and in some examples without the need for the SSDs to communicate between the SSDs through an intermediary device, such as a host processor. The data storage system 100 may include one or more hosts 102 (hereinafter also referred to as "host 102), a data storage 136 comprising one or more solid-state drives (SSDs) 130, 140, 150, which are communicatively coupled to the one or more hosts through a switching device 110. The one or more hosts may work as a server offering information resources, services, and/or applications to users or other nodes on a network. In some examples, the one or more hosts may include virtual machines (VM). The VM may be implemented on the host using Peripheral Component Interconnect Express (PCIe) single root input/output virtualization (SR-IOV). In various examples, the one or more hosts 102 may by coupled to a network 106 through a communications link 101, such as a wired network link, such as a Local Area Network (LAN) or a Wide Area Network (WAN), and/or a wireless communication link, such as the Internet. Network 106 may include one or more other devices, such as one or more additional hosts, interface switches, and/or data storage systems that are communicatively coupled to the one or more hosts 102, wherein these additional devices and systems may request and receive data storage services involving one or more of SSDs 130, 140, and/or 150.

In various examples, one or more of SSDs 130, 140, and 150 may comprise an integrated circuit (IC) based storage mechanism which can store data persistently to enable the one or more hosts 102 to provide needed functionality. The SSDs 130, 140, and 150 may be capable of providing higher bandwidth and lower latency compared to a hard disk drive (HDD).

The interface switch ("switch") 110 may be positioned between the one or more hosts 102 and the SSDs 130, 140, and 150, and may be configured to communicatively couple the one or more hosts with these SSDs. In various examples, switch 110 is an NVMe switch configured to processes NVMe commands to control PCIe based point-to-point switch connections between the one or more hosts 102 and the SSDs 130, 140, and 150. In some examples of system 100, every SSD has its own dedicated connection to the one or more hosts 102. In various examples, switch 110 includes processor circuitry 114 communicatively coupled to a host interface 112, a SSD interface 116 and a memory containing queues 118.

Examples of processor circuitry 114 may include one or more computer processors, such as microprocessors, and additional circuitry, such as one or more of a management processor module, a command processor module, and data processor module. In some examples, the host interface may be an endpoint, such as but not limited to a PCIe endpoint cluster, which facilitates communication between the switch 110 and the one or more hosts 102, while the SSD interface, which in some examples may be a PCIe root complex cluster, facilitates communication between the switch 110 and the SSDs 130, 140, and 150. The command processor of the processor circuitry 114 may be configured to processes commands from the one or more hosts 102. The command may be a command, for example an NVMe command, to fetch data from the one of the SSDs, and provide to a host or store data from a host in the SSD. The command processor of the processor circuitry may be configured to add a tag to the command. The tag may indicate that the command is received from a specific host. The command is then sent to the one of the SSDs that may be specified as part of the command. Thus, the switch 110 may provide additional processing, such as header and address changes, that need to be made in order to provide proper routing and handing of the requests, commands, and/or data being communicated between the host 102 and the SSDs 130, 140, and 150.

In response to receiving command or a request, the SSD to which the command or request was directed may send a PCIe memory request, such as a PCIe memory read request, to the switch 110. The PCIe memory request may include the tag to enable the data processor module of the processor circuitry 114 to send the PCIe memory request to the specified host in order to perform the command or request associated with the host. The management processor module may be configured perform management functions for the switch 110. For example, if a NVMe or PCIe transaction does not conform to the what the command processor module can perform (e.g., either due to error, or complexity/size of the PCIe memory request), the function may be offloaded to the management processor module. As another example, the management processor module may manage partitions of the SSDs 130, 140, and/or 150 with respect to reservation access and/or namespaces associated with the SSDs.

In various examples, one or more hosts 102 may implement a queue pair, for example in accordance with NVMe, in order to facilitate SSD access. The queue pair may consist of a submission queue and a completion queue. As shown for system 100, a host may include a submission queue 105 and completion queue 107. The host may also have additional queues, such as management queues as well. The host may generate a command, such as an NVMe command, including a data storage service request to fetch data stored in the SSDs or store data to the SSDs, wherein the command is placed in the submission queue 105. The command is forwarded from the host to the switch 110, as illustratively represented by arrow 104.

When the command is eventually executed by the SSDs 130, 140, and/or 150, a completion indicating that the execution of the procedures dictated by the command have been completed may be stored in the completion queue 107. As part of this process, switch 110 may include a device queue manager module as part of processor circuitry 114. The device queue manager module may provide queue pairs 118 to facilitate communication of commands between the switch 110 and the SSDs 130, 140, and 150. The device queue manager module may maintain corresponding submission queues and completion queues for each of the SSDs 130, 140, 150 that are coupled to the switch through interconnect 137. As shown, queue pairs 118 may include queues 121 including a submission queue (SQ) and a completion queue (CQ) associated with SSD 130 (SSD-1), queues 122 including a submission queue (SQ) and a completion queue (CQ) associated with SSD 140 (SSD-2), and queues 123 including a submission queue (SQ) and a completion queue (CQ) associated with SSD 150 (SSD-N). Additional pairs of queues may be provided as part of queues 118 for association with any additional SSDs included in data storage 136.

In various examples, the command processor module of processor circuitry 114 may terminate commands, such as an NVMe command, received from the host 102 associated a request for access to an SSD by distributing an indication in the SQ for a particular one of the queue pairs 121, 122, or 123 based on the SSD 130, 140, 150, respectively, to which the request for the data storage service is being directed. These requests for data storage services from the host 102 may then be distributed to the respective SSD by commands issues by the switch 110 through SSD interface 116, as represented by arrow 111 extending between switch 110 and the SSDs 130, 140, and 150.

One or more of SSDs may receive the command, as directed by the switch 110. Upon receiving the command, the respective SSD or SSDs may update the submission queue located in that SSD to indicated that a command has been received, and then the local processor for that SSD may begin performing the actual data storage procedure indicated to be performed by the command.

Upon completion of the requested data storage procedure, the one or more of SSDs 130, 140, and 150 may issue a command indicating that the requested service has been completed, and forward the indication of the completion back to the switch 110, and illustratively represented by dashed arrow 113. Completion of the data storage procedure may also include the SSD or SSDs that performed the process updating the respective completion queue located within the SSD or each of respective SSDs to indicate that the procedure indicated by the command has been performed and completed.

Upon receiving the indication of the completion at switch 110, the indication may be stored in a respective one of the CQ queues of the queue pairs 121, 122, 123 located at the switch and associated with the SSD that provided the indication of the completion. The device queue manager module of switch 110 may then process the indication of the completion stored in the CQ, including preparing a command, which is sent through the host interface 112, as illustratively represented by dashed arrow 108, from switch 110 to the CQ 107 of the host 102. The host may then update the status of the command by clearing the indication of the submission of the command stored queue 105 based on the update to completion queue 107 indicating completion of the procedure being requested by the command.

As illustrated in FIG. 1, the interconnect 103 that is used to communicatively couple the one or more hosts 102 with the switch 110 may require a different communication format, and/or a different data interface, compared to the communication format and/or the data interface used to communicatively couple switch 110 with the SSDs 130, 140, and 150. As such, additional processing, and thus time delays in processing commands, are generally encountered as switch 110 processes and formats requests for data storage services from host 102 to SSD 130, 140, and 150, and forwards responses back, including requests for reading or writing data, from the SSDs to the one or more hosts 102. In addition, in order to process these command and data requests, switch 110 may generally also needs to store data, such as device identifications, addresses, and/or data, redundantly at the switch, whcih requires additional memory requirements and processing to be provided by the switch itself. In examples where host 102 may be directly coupled to SSDs 130, 140, and 150 directly without the use of switch 110, the host itself may be required to handle the management and storage of the data transactions being performed, thus loading the processing and data storage requirements directly at and onto the host.

As shown in FIG. 1, the SSDs of system 100 may be configured to provide direct communication between the SSDs themselves, for example using interconnect 137 and in some examples interconnect 139, without the need to involve the one or more hosts 102. In various embodiments, communications between SSDs may be routed to a switch, such as switch 110, where the communications may be re-routed as peer-to-peer traffic to another SSD. As shown in FIG. 1, SSDs 130, 140, and 150 are configured to include a submission queue (SQ) and a corresponding completion queue (CQ) within the SSD itself, the SQ and CQ allowing the SSDs to communication commands and/or requests for data storage services or other data related processes directly between one another.

As an non-limiting example of system 100, SSD 130 includes a local processor 132, a memory array 135, a submission queue (SQ) 133, and a completion queue (CQ) 134, SSD 140 includes a local processor 142, a memory array 145, a submission queue (SQ) 143, and a completion queue (CQ) 144, and SSD 150 includes a local processor 152, a memory array 155, a submission queue (SQ) 153, and a completion queue (CQ) 154. Each of the memory arrays 135, 145, and 155 may include an array of persistent memory devices configured to allow digital data to be written to, read from, and erased within the memory array. The respective SQ and CQ for each of the SSDs may be located in a portion of the respective memory array for the SSD, or may be configured as a separate memory located within each of the respective SSDs. The local processors 132, 142, and 152 for each SSD may be configured to manage data operations associated with the respective SSD where the local processor is located, such as reading, writing, and erasing data operations associated with the memory array of the SSD where the local processor is located.

In addition, the local processors 132, 142, and 152 may also be configured to operate in an initiator mode, wherein the local processor may initiate a command and/or a request for data storage services or other data related processes that are to be performed by another SSD and which originated at the SSD where the local processor is located, and was not issued by or received from the one or more hosts 102 and/or from switch 110. In various alternative examples, the SSD originating the command or request may do so in response to a command or request directed to the SSD by a host, such as host 102, but that was initially only directed to the SSD originating the command or request directed to another one of the SSDs.

By way of non-limiting example, arrow 147 extending from SSD 140 (SSD-2) to SSD 130 (SSD-1) represents a communication, which may include a command or a request to perform a data storage service or other data storage procedure, that is initiated by SSD 140 and communicated directly to SSD 130, for example using interconnect 137, and without passing through switch 110. As part of initiating the communication, local processor 142 of SSD 140 may input into SC 143 of SSD 140 an indication that a command and/or a request has been initially generated by SSD 140, and issued to SSD 130. Upon receiving the command and/or request at SSD 130, local processor 132 may update SQ 133 of SSD 130 to indicated that the request has been received, and then continue with processing the received command/request. From the standpoint of the target SSD, in this example SSD 130, the request is just like any other type of request that may be received for example from a host device, such as host 102. The target SSD does not necessarily have information indicating that the communication is from another SSD, and therefore operates on the request as if it were from a host device, such as host 102.

Upon completion of the processing of the command/request, the CQ 134 of SSD 130 may be updated to provide an indication that the command/request has been completed. Based on the updated indication, local processor 132 may clear the indication of the receipt of the command/request from the SQ 133, and provide a communication directed to SSD 140, which is illustratively represented by dashed arrow 148 extending between SSD 130 and SSD 140. The communication may include an indication of the completion of the command/request originally generated and initiated by SSD 140. Upon receiving the indication of the completion of the command/request originally initiated by SSD 140, local processor 142 may update CQ 144 with an indication that the command/request has been completed, and update SQ 143 of SSD 140 to remove or clear the indication that the command/request is pending. Again, the communication from SSD 130 to SSD 140 illustratively represented by dashed arrow 148 may be made using interconnect 137, and completed without passing through switch 110 or host 102.

Based on the indication of the completing of the command/request, or in the alternative while the command/request is still pending, local processor 142 of SSD 140 may perform one or more other processes, including generating and initiating one or more commands/requests communication directly to other SSD including in data storage 136, receiving and processing commands/requests received from other SSDs included in data storage 136, and/or communicating with switch 110 and/or processing commands/requests sent from host 102 through switch 110 directed to SSD 140 for data storage services. SSD 140 may utilize SQ 143 and CQ 144 to keep track of the pending data storage operations that have been both initiated by SSD 140 and that have been requested to be performed by SSD 140, and to track the completion of these operations.

With respect to the queues established at the SSDs, the SQ and CQ are normally only used for slave operations, where the SSD is a target device receiving the requests or commands, and responding to the received requests or commands. In these instances, the SQ holds all the transactions that the SSD needs to perform and the CQ holds all the transactions that were completed and need to be reported back to the requestor. In other words, the SQ is an INPUT to the SSD with all the requests or commands the SSD has been asked to do, and the CQ is the SSD's OUTPUT queue with its responses. When an SSD is operating in the initiator mode, the purpose of these queues (while may be named the same) would need to be from a host perspective which includes: the SQ would be the OUTPUT queue of the SSD recording all with all the jobs the initiator SSD has requested other SSD to do, and the CQ would be the INPUT to the SSD with the responses from the other SSDs.

Examples of system 100 are not limited to a particular one or any particular one of the SSDs being configured to act in an initiator mode to generate and issue commands/requests to other SSD, and in various examples, one, some, or all of the SSDs coupled together as part of data storage 136 may be configured to operate in an initiator mode, and to generate and issue commands/requests for data storage services directly to other SSDs without going through an intermediary device such as a host 102. For example, SSD 130 may operate in an initiator mode, and generate and issue one or more commands or requests for data storage procedure(s) to be communicated to and performed by one or both of SSDs 140 and 150. Similarly, SSD 140 and/or SSD 150 may operate in an initiator mode, generate and issue one or more commands or requests for data storage procedure(s) to be communicated to and performed by one or more other SSDs.

The ability of SSDs 130, 140, and 150 to communicate directly with one another without having the communication pass through an intermediate device, such as a host 102, may save processing time by not having to have the communication formatting and/or the data formats used to transfer the commands/requests from device to device to be redundantly saved at one or more of the intermediate devices, such as a switch or a host. The direct communications between the SSDs may also speed up the overall throughput of the communications, and thus the overall processing of the commands/requests by eliminating the need to change over the formatting of the messages at these intermediate devices, such as from the hosts to a switch to the SSD, and back up from the SSDs through the switch and to the host(s).

Examples of system 100 are not limited to having a particular number of SSDs. In various examples, system 100 may comprise as few as two SSDs, and may comprise some positive integer number "N" SSDs, as illustratively represented in FIG. 1 by the dots generally indicated by bracket 138. As a non-limiting example, data storage may include multiple individual SSDs coupled to interconnect 137/139 in an arrangement of system 100. Each of the SSDs included in system 100 may be communicatively linked to switch 110, as illustratively represented in FIG. 1 by interconnect 137 and dashed arrow 139 representing communicative links to any SSDs represented by the dots generally indicated by bracket 138.

The types of data storage services or data storage procedures that may be generated by an SSD and communicated directly to one or more other SSDs is not limited to any particular type of command or request. In various examples, the command or request may involve a same type of read, write, or erase request that may also be generated and sent to the one or more SSDs from a host, such as host 102. In various examples, an individual SSD such as SSD 130, 140, or 150 may have a command or request originally initiated by a host, such as host 102, directed to the SSD, wherein the SSD may then perform the task or procedure indicated by the command or request, and return an indication that the task or procedure has been completed without involving any of the other SSDs included in data storage 136.

For example, an SSD such as SSD 130, 140, or 150 receiving a write request from the remote host, such as host 102, or a host coupled system 100 through network 106 may generate a subsequent request to a peer SSD and forward to the peer SSD the request, or alternatively duplicate the write request to be performed by the SSD and the peer SSD, for example for redundancy purposes. In both instances, the receiving SSD would be still the one to interface the remote host for completion, but the actual job may be done by a different SSD. In examples of system 100, there may be some entity, such as one of the local processors located with the SSDs, or a separate processor or processors, that will load-balance the work between receiving SSDs to ensure that no bottlenecks evolve. Having such a solution may enable full box virtualization for example without adding complex compute resources that are needed to accomplish that in existing systems.

In various examples, the individual SSD having a command or request originally generated by a host, such as host 102, and directed to the individual SSD may then operate in an initiator mode, and generate and issue additional commands and/or requests that are directed to one or more SSDs included in data storage 136, but that were not specifically included in the original command and/or request generated and issued by the host. As a non-limiting example, a host such as host 102 may generate and issue a command to read and forward back to the host all data (e.g., video and audio data) associated with a movie. The command may be directed to a single SSD, for example SSD 130. However, the data associated with the movie may be stored in multiple ones of the SSDs included in data storage 136. In response to receiving the command initially generated and issued by the host 102, SSD 130 may operate in an initiator mode, and generate and issue to SSDs 140 and/or to SSD 150 commands to read and forward back to SSD 130 data associated with the movie that is stored at these respective SSDs. The SSDs 140 and 150 may be considered to be target SSD with respect to the command being issued by SSD 130, and in response to receiving the command from SSD 130, may perform the required data read/forward operations by replying back to SSD 130 with the requested data.

The communications between SSD 130 and SSD 140 and/or SSD 150 may occur over interconnect 137, which may include passing through switch 110, but without the need to have any of the communications pass through host 102. Once SSD 130 has received the requested data from SSD 140 and/or SSD 150, SSD 130 may coordinate the forwarding of the requested data associated with the movie back to the switch 110 and/or host 102 to complete the operation initially requested in the command issued by the host and directed to SSD 130. This ability to have the SSDs included in data storage 136 pass between the individual SSDs without the need to also pass through or be controlled by the switch 110 or the host 102 may allow faster overall processing to the command while unloading the host 102 and the switch 110 with respect to memory and/or processing load requirements.

In various examples, operations requested by an SSD operating in an initiator mode may not be triggered by a command or request initially generated by a host, such as host 102. As a non-limiting example, a command or request may be generated and issued by first SSD of data storage 136 requesting to have a second SSD of data storage 136 copy data in the first SSD into the second SSD for redundancy purposes. Such a command may be initiated by the first SSD without being prompted or triggered by any commands or requests coming from the switch 110 or the host 102. In this example, the first SSD may therefore be configured to initiate a command or request to perform the data backup procedure at some predetermined time interval, or for example based on detection of a triggering event, such as the detection of loss of power or a shutdown of system 100.

Other types of functions or events that may trigger an SSD to operate in the initiator mode may include transferring tasks from the initiator SSD to a target SSD, virtualizing the physical drives from a remote host processor, data management tasks, and self-healing system functions. For example, an SSD of data storage 136 may operate in an initiator mode to generated commands requesting that various functions, such as computational storage functions, be performed on data stored at other SSDs included in data storage 136. These computational storage function may include the use of artificial intelligence (AI) to perform the computational storage functions.

The type of communication protocol and network format used to provide the communications utilized between the SSDs of data storage 136 over interconnect 137/139 are not limited to any particular protocol or network standard(s). In one non-limiting example, communications between SSD included in data storage 136 include use of PCI express as the transport layer, and MVE as the protocol layer. Variations may include use of NVMe as the transport layer for the communications. Variations may include use of Ethernet. When including Ethernet as part of the communication links between SSDs, additional queues, such as Remote Direct Memory Access (RDMA) queue pairs or Transmission Control Protocol (TCP) queues, may be set up at the SSD to establish these communication links that then utilize Ethernet communication formatting.

Example Solid-State Drive Initiator Mode

In various examples, one or more SSDs communicatively coupled together as part of a data storage system may operate in an initiator mode to provide direct communication between a first SSD and a second SSD, wherein the first SSD acts as an initiator to generate and issue a command and/or a request associated with data storage management directly to a the second SSD without the need for the communications to pass through an intermediate device, such as a switching device or a host, and without having the command/request being initiated from a host.

Figure 2:
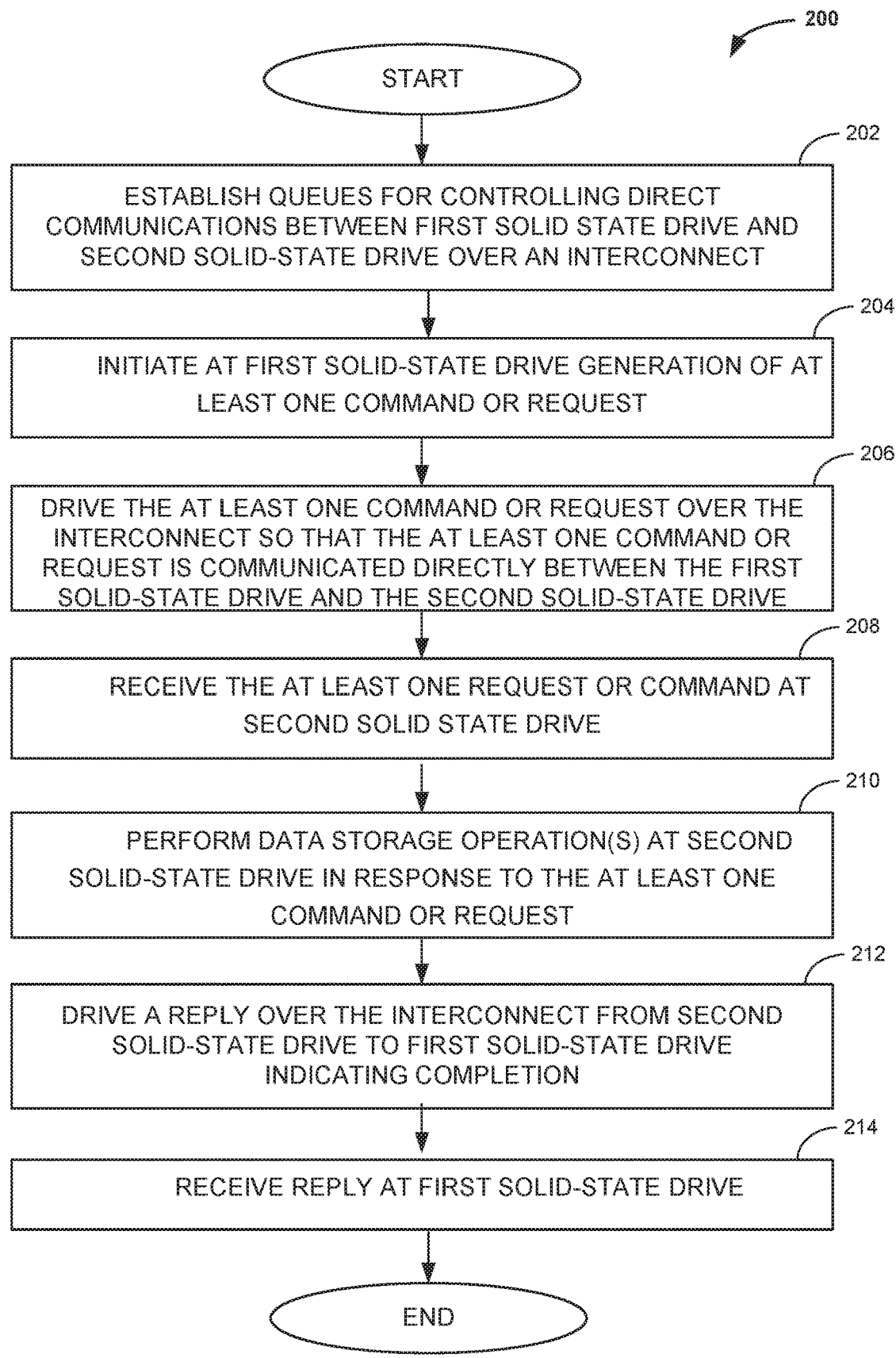
FIG. 2 is a flowchart of a method according to various examples described in this disclosure and any equivalents thereof.

FIG. 2 is an example flowchart of a method 200 according to various examples described in this disclosure and any equivalents thereof. Method 200 comprises various functions associated with one or more SSDs operating in an initiator mode to generate and issue directly communicated commands or requests associated with data storage management to another SSD, without having the communications passing through an intermediate device such as a switch or a host device.

At block 202, method 200 includes establishing, at a first solid-state drive and at a second solid-state drive, a set of queues configured for controlling direct communications between the first solid-state drive and the second solid-state drive over an interconnect coupling the first solid-state drive with the second solid-state drive. In various embodiments, a first set of queues established at the first solid-state drive includes a first submission queue and a first completion queue, and a second set of queues established at the second solid-state drive includes a second submission queue and a second completion queue. In various embodiments, a first set of queues established at the first solid-state drive includes an SQ and CQ for protocol operations of the drive, and in some embodiments a second set of queues on top of the first set of queues, such as one or more RDMA queue pairs or TCP queues, are established for protocol operation of the fabric, for example Ethernet.

At block 204 method 200 includes initiating, by the first solid-state drive, generation of at least one command or request. In various embodiments, a request may include a request to write data to a memory array of a solid-state drive, such as the second solid-state drive. In various embodiments, a request may include a request to read data from a memory array of a solid-state drive, such as the second solid-state drive. In various embodiments, a request may include a request to erase data from some portion or all of a memory array included in a solid-state drive, such as the second solid-state drive. In various embodiments, a command may include a command to perform a data management operation related to a memory array and/or a solid-state drive, such as the second solid-state drive.

At block 206, method 200 includes driving, by the first solid-state drive, the at least one command or request over the interconnect so that the at least one command or request is communicated directly between the first solid-state drive and the second solid-state drive. Communicating the at least one command or request in various examples include driving the at least one command or request over PCIe interface. Communicating the at least one command or request in various examples include driving the at least one command or request over a NVMe over Fabric interface. In various examples, communicating the at least one command or request includes communicating over an Ethernet connection. In examples using an Ethernet connection, method 200 may include establishing a second or additional set of queues RDMA QPs or TCP queues dedicated to the operation of the fabric used in the communication path for the interconnect.

At block 208, embodiments of method 200 include receiving, at the second solid drive, the at least one command or request communicated by the first solid-state drive. Receiving the at least one command or request may include updating at least one queue in the second solid-state drive, such as a submission queue in the second solid-state drive, to indicate that a command or request for some data storage related operation has been received at the second solid-state drive.

At block 210, examples of method 200 include performing, by the second solid-state drive, one or more data storage related operations on data stored at the second solid-state drive in response to receiving the at least one command or request. Performing the one or more data storage related operations may include writing data to the memory array included in the second solid-state drive. Performing the one or more data storage related operations may include reading data from the memory array included in the second solid-state drive. Performing the one or more data storage related operations may include erasing data from some portion or portions of the memory array included in the second solid-state drive. Performing the one or more data storage related operations may include performing computational storage operation(s) on the data stored at the second solid-state drive. Performing the one or more data storage related operations may include rearranging the data stored at the second solid-state drive, for example as part of a de-fragmentation procedure performed on the data stored at the second solid-state drive.

Upon completion of the operation(s) to be performed by the second solid-state drive as dictated by the at least one command or request, examples of method 200 include updating at least one queue in the second solid-state drive, such as a completion queue in the second solid-state drive, to indicate that operations have been completed by the second solid-state drive.

At block 212, examples of method 200 include driving, by the second solid-state drive, a reply over the interconnect to the first solid-state drive, the reply indicating that that one or more data operations on the data stored at the second solid-state drive have been completed. In various examples, data that was read from the second solid-state drive may also be driven over the interconnect to the first solid-state drive in response to the command or request initiated by the first solid-state drive and communicated to the second solid-state drive.

At block 214, examples of method 200 include receiving, at the first solid-state drive, the reply indicating at least that the data storage operation indicated by the command or request has been completed by the second solid-state drive. In various examples of method 200, receiving the reply at the first solid-state drive includes updating a queue at the first solid-state drive, such as a completion queue at the first solid-state drive, with an indication that the command or request sent from the first solid-state drive to the second solid-state drive have been completed by the second solid-state drive. Updating a queue at the first solid-state drive based on receiving the indication that the command or request sent from the first solid-state drive to the second solid-state drive have been completed by the second solid-state drive includes updating the submission queue at the first solid-state drive to clear out the indication related to the submission of the at least one command or request.

Example Apparatus

Figure 3:
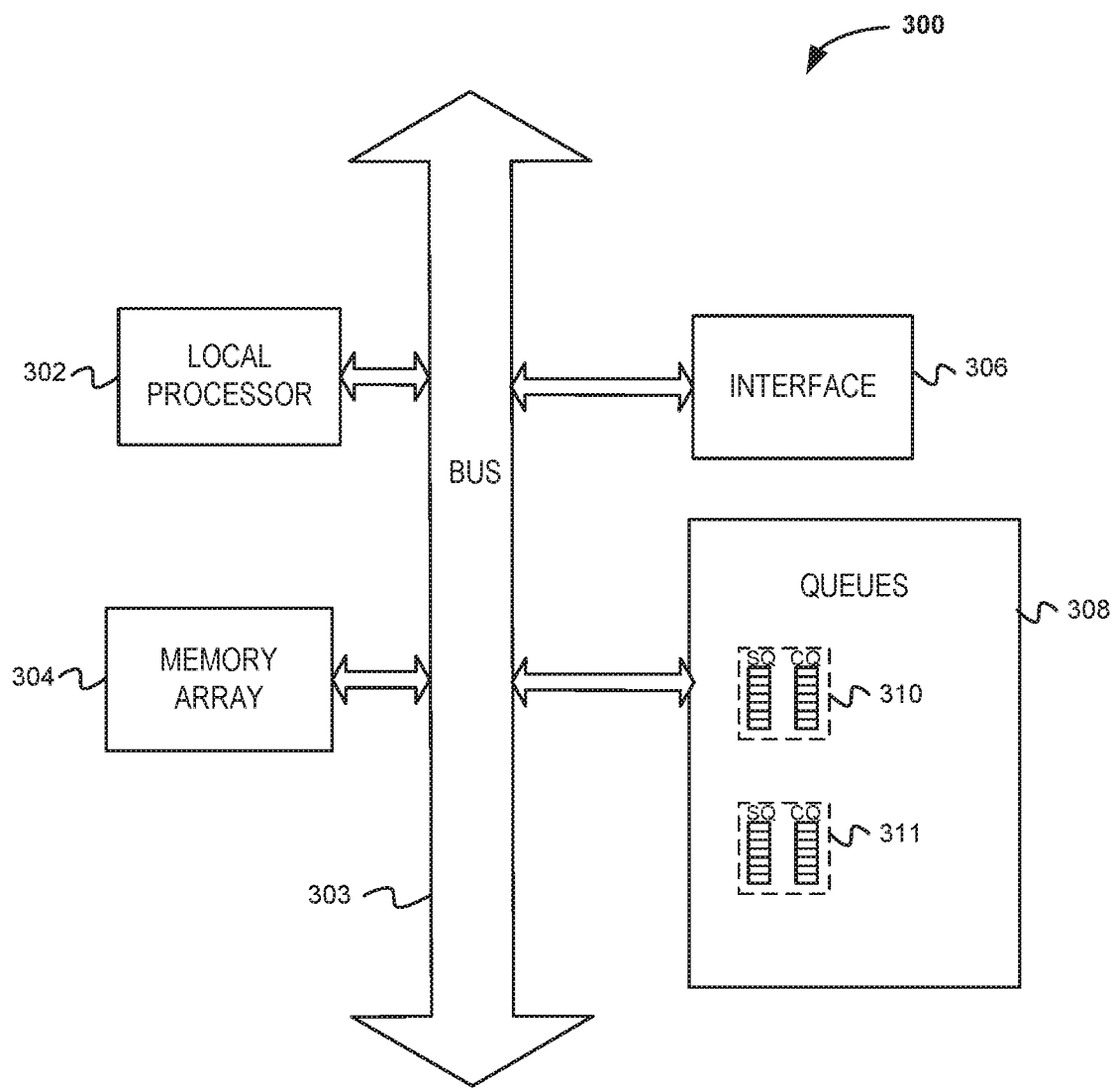
FIG. 3 is a simplified example block diagram of solid-state drive that may be configured according to various examples as described throughout this disclosure and any equivalents thereof.

FIG. 3 is a simplified example block diagram of solid-state drive 300 that may be configured according to various examples as described throughout this disclosure, and any equivalents thereof. Examples of solid-state drive (SSD) 300 may include a local processor 302, a memory array 304, an interface 306, and one or more sets of queues 308. A bus 303 may be coupled to the various elements included in SSD 300, and be configured to communicatively couple these elements. Examples of SSD 300 may be any one or more of SSDs 130, 140, and/or 150 as illustrated and described with respect to FIG. 1, and may be configured to perform some or all of the functions described with respect to method 200 (FIG. 2) and any equivalents thereof.

Examples of local processor 302 may include multiple processors, multiple cores, multiple nodes, and/or implementing multi-threading, etc.) that coordinates operations on the SSD 300. Examples of memory array 304 are not limited to any particular type of memory, and may include memory 604 may be system memory (e.g., one or more of cache, random access memory (RAM), synchronous RAM (SRAM), dynamic RAM (DRAM), zero capacitor RAM, Twin Transistor RAM, embedded DRAM (eDRAM), extended data output RAM (EDO RAM), double data rate RAM (DDR RAM), electrically erasable programmable read only memory (EEPROM), Nano-RAM (NRAM), resistive RAM (RRAM), silicon-oxide-nitride-oxide-silicon memory (SONOS), parameter random access memory (PRAM), etc.) or any one or more other possible realizations of non-transitory machine-readable media/medium.

Examples of interface 306 are not limited to any particular type of interface, and may include one or more interface devices or modules controllable by local processor 302 to provide communications between SSD 300 and one or more other SSDs using any of the methods and/or techniques described throughout this disclosure, and any equivalents thereof. For example, interface 306 may be controlled by a local processor to provide direct communication between SSD 300 and another SSD over an interconnect without the need for the communications to pass through an intermediary device, such as a host device. Interface 306 may provide direct communications with another SSD when SSD 300 is operating in an initiator mode, and generate and issue a command or request for another SSD to perform some data storage related procedure. Interface 306 may provide direct communications with another SSD when SSD 300 is operating as a target SSD, and is receiving a command or request sent directly to SSD 300 from another SSD acting in the initiator mode.

In various examples, interface 306 may also be configured to transmit and receive commands and requests directed to SSD 300 from one or more hosts, such as one or more hosts 102 (FIG. 1) coupled to SSD 300 for example through a switching device, such as switch 110 (FIG. 1).

Bus 303 is not limited to any particular type of bus, and may for example be compliant with Peripheral Component Interconnect (PCI), Industry Standard Architecture (ISA), PCI-Express, New Bus (NuBus), Advanced Extensible Bus AXI Bus, and Ethernet standards. Bus 303 may also facilitate communications between local processor 302 and the memory array 304 and queues 308. Queues 308 may include one or more queues established to provide a communication link between SSD 300 and one or more other SSDs. In various examples, queues 308 includes a pair of queues 310 including a submission queue (SQ) and a completion queue (CQ) configured to allow a communication link to be established between SSD 300 and another SSD. Additional queues, illustratively represented by queue 311, may also be established within queues 308 as needed to provide any and all of the communication links that SSD 300 may need in order to communication with one or more hosts and also to communicate directly with one or more additional SSDs while acting in an initiator mode without the need for the communication between SSD 300 and one or more other SSDs to pass through an intermediary device, such as a switch or a host.

These functions ascribed to SSD 300 may be implemented in a combination of hardware and/or software (e.g., computer code, program instructions, program code, computer instructions) stored on a non-transitory machine readable medium/media. In some instances, the local processor 302 and memory array 304 may implement or facilitate implementing the functionalities instead of or in addition to a management processor module, data processor module, and/or a command processor module. Further, examples of SSD 300 may include fewer or additional components not illustrated in FIG. 3 (e.g., video cards, audio cards, additional network interfaces, peripheral devices, etc.).

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method in a data storage system that includes a host communicatively coupled to a first solid-state drive and a second solid-state drive via a switching device, the method comprising:
   establishing, at the first solid-state drive and at the second solid-state drive, a set of queues configured for controlling direct communications between the first solid-state drive and the second solid-state drive over an interconnect coupling the first solid-state drive with the second solid-state drive, including establishing at the first solid-state drive i) a submission queue that is configured to store indications of commands issued by the first solid-state drive to the second solid-state drive, and ii) a completion queue configured to store indications of completions of commands executed by the second solid-state drive;
   initiating, by the first solid-state drive, generation of at least one command to be executed by the second solid-state drive;
   driving, by the first solid-state drive, the at least one command over the interconnect so that the at least one command is communicated directly between the first solid-state drive and the second solid-state drive;
   storing, by the first solid-state drive, the submission queue of the first solid-state drive an indication that the at least one command was issued by the first solid-state drive to the second solid-state drive;
   receiving, at the first solid-state drive, at least one respective indication from the second solid-state drive that the second solid-state drive completed at least one respective data operation corresponding to the at least one command; and
   updating the completion queue of the first solid-state drive to indicate that the at least one command was completed by the second solid-state drive.

2. The method of claim 1, further comprising:
   receiving, at the second solid-state drive, the at least one command communicated by the first solid-state drive;
   performing, by the second solid-state drive, the at least one data operation on data stored at the second solid-state drive in response to receiving the at least one command; and
   driving, by the second solid-state drive, the at least one respective indication over the interconnect to the first solid-state drive.

3. The method of claim 1, wherein the interconnect coupling the first solid-state drive with the second solid-state drive utilizes Peripheral Component Interconnect Express (PCIe) and Ethernet.

4. The method of claim 1, further comprising:
   entering an initiator mode at the first solid-state drive and initiating the generation of the at least one command in response to an incoming command originated by a host and received at the first solid-state drive.

5. The method of claim 1, further comprising:
   entering an initiator mode at the first solid-state drive and initiating the generation of the at least one command in response to a detection of an event not associated with a command originated by a host.

6. The method of claim 1, wherein initiating the generation of the at least one command to be executed by the second solid-state drive, and driving the at least one command over the interconnect so that the at least one command is communicated directly between the first solid-state drive and the second solid-state drive, is performed in response to detecting a loss of power or a shutdown, and without being prompted or triggered by any commands or requests from the host or from the switching device.

7. The method of claim 1, further comprising:
   in response to the first solid-state drive receiving the at least one respective indication from the second solid-state drive, removing or clearing, by the first solid-state drive, the indication that the at least one command was issued by the first solid-state drive to the second solid-state drive from the submission queue of the first solid-state drive.

8. The method of claim 1, wherein updating the completion queue of the first solid-state drive comprises:
   in response to the first solid-state drive receiving the at least one respective indication from the second solid-state drive, updating, by the first solid-state drive, the completion queue of the first solid-state drive with an indication that the at least one command was completed.

9. A non-transitory computer-readable medium storing instructions that, when executed by one or more processors, cause the one or more processors to at least:
   establish, at a first solid-state drive and at a second solid-state drive, a set of queues configured for controlling direct communications between the first solid-state drive and the second solid-state drive over an interconnect coupling the first solid-state drive with the second solid-state drive, including establishing at the first solid-state drive i) a submission queue that is configured to store indications of commands issued by the first solid-state drive to the second solid-state drive, and ii) a completion queue configured to store indications of completions of commands executed by the second solid-state drive;
   initiate, at the first solid-state drive, generation of at least one command to be executed by the second solid-state drive;
   drive the at least one command over the interconnect so that the at least one command is communicated directly between the first solid-state drive and the second solid-state drive;
   store, by the first solid-state drive, in the submission queue of the first solid-state drive an indication that the at least one command was issued by the first solid-state drive to the second solid-state drive;
   receive, at the first solid-state drive, at least one respective indication from the second solid-state drive that the second solid-state drive completed at least one respective data operation corresponding to the at least one command; and
   update the completion queue of the first solid-state drive to indicate that the at least one command was completed by the second solid-state drive.

10. The non-transitory computer-readable medium of claim 9, further comprising instructions to:
    receive, at the second solid-state drive, the at least one command communicated by the first solid-state drive;
    perform one or more data operations on data stored at the second solid-state drive in response to receiving the at least one command; and
    drive the at least one respective indication over the interconnect to the first solid-state drive.

11. The non-transitory computer-readable medium of claim 9, wherein the instructions to drive the at least one command over the interconnect comprise instructions to drive the at least one command over the interconnect using Peripheral Component Interconnect Express(PCIe) and Ethernet.

12. The non-transitory computer-readable medium of claim 9, further comprising:
instructions for entering an initiator mode at the first solid-state drive and initiating the generation of at least one command in response to an incoming command originated by a host and received at the first solid-state drive.

13. The non-transitory computer-readable medium of claim 9, further comprising:
instructions for entering an initiator mode at the first solid-state drive and initiating the generation of at least one command in response to a detection of an event not associated with a command originated by a host.

14. The non-transitory computer-readable medium of claim 9, further comprising instructions to:
initiate the generation of the at least one command to be executed by the second solid-state drive, and drive the at least one command over the interconnect so that the at least one command is communicated directly between the first solid-state drive and the second solid-state drive, in response to detecting a loss of power or a shutdown, and without being prompted or triggered by any commands or requests i) from a host that is communicatively coupled to the first solid-state drive and the second solid-state drive via a switching device, or ii) from the switching device.

15. The non-transitory computer-readable medium of claim 9, further comprising instructions to:
in response to the first solid-state drive receiving the at least one respective indication from the second solid-state drive, remove or clear, by the first solid-state drive, the indication that the at least one command was issued by the first solid-state drive to the second solid-state drive from the submission queue of the first solid-state drive.

16. A first solid-state drive configured to operate in a data storage system that includes a host communicatively coupled to the first solid-state drive and at least one second solid-state drive via a switching device, the first solid-state drive comprising:
a local processor;
a local memory coupled to the local processor, the local memory configured to store a set of queues configured for controlling direct communications between the first solid-state drive and the second solid-state drive over an interconnect coupling the first solid-state drive with the second solid-state drive, the set of queues including i) a submission queue that is configured to store indications of commands issued by the first solid-state drive to the second solid-state drive, and ii) a completion queue configured to store indications of completions of commands executed by the second solid-state drive; and
a memory array that is configured to store persistent digitally encoded data on non-volatile memory;
wherein the local processor is configured to:
initiate generation of at least one command to be executed by the second solid-state drive,
drive the at least one command over the interconnect so that the at least one command is communicated directly between the first solid-state drive and the second solid-state drive,
store in the submission queue of the first solid-state drive an indication that the at least one command was issued by the by the first solid-state drive to the second solid-state drive,
receive at least one respective indication from the second solid-state drive that the second solid-state drive completed at least one respective data operation corresponding to the at least one command, and
update the completion queue of the first solid-state drive to indicate that the at least one command was completed by the second solid-state drive.

17. The first solid-state drive of claim 16, wherein the local processor is configured to drive the at least one command over the interconnect using Peripheral Component Interconnect Express (PCIe) and Ethernet.

18. The first solid-state drive of claim 16, wherein the local processor is configured to:
operate in a initiator mode wherein the local processor initiates, in response to detecting a loss of power or a shutdown, and without being prompted or triggered by any commands or requests from the host or from the switching device, initiate the generation of the at least one command to be executed by the second solid-state drive, and drive the at least one command over the interconnect so that the at least one command is communicated directly between the first solid-state drive and the second solid-state drive.

19. The first solid-state drive of claim 16, wherein the local processor is further configured to:
in response to the first solid-state drive receiving the at least one respective indication from the second solid-state drive, remove or clear the indication that the at least one command was issued by the first solid-state drive to the second solid-state drive from the submission queue of the first solid-state drive.

20. The first solid-state drive of claim 16, wherein the local processor is configured to:
in response to the first solid-state drive receiving the at least one respective indication from the second solid-state drive, update the completion queue of the first solid-state drive with an indication that the at least one command was completed.

* * * * *